(12) United States Patent
Mannion et al.

(10) Patent No.: US 11,264,228 B2
(45) Date of Patent: Mar. 1, 2022

(54) METHOD OF MAKING A CARBON FILAMENT FOR THERMAL IONIZATION

(71) Applicant: Savannah River Nuclear Solutions, LLC, Aiken, SC (US)

(72) Inventors: Joseph M. Mannion, Aiken, SC (US); Randall M. Achey, New Ellenton, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 660 days.

(21) Appl. No.: 16/155,143

(22) Filed: Oct. 9, 2018

(65) Prior Publication Data
US 2020/0111656 A1 Apr. 9, 2020

(51) Int. Cl.
| | | |
|---|---|---|
| *H01J 49/16* | (2006.01) |
| *C01B 32/194* | (2017.01) |
| *H01J 49/00* | (2006.01) |
| *G01N 1/40* | (2006.01) |
| *C01B 32/198* | (2017.01) |
| *H01J 1/14* | (2006.01) |
| *C01B 32/10* | (2017.01) |

(52) U.S. Cl.
CPC ............. *H01J 49/16* (2013.01); *C01B 32/10* (2017.08); *C01B 32/194* (2017.08); *C01B 32/198* (2017.08); *G01N 1/4022* (2013.01); *H01J 1/14* (2013.01); *H01J 49/0031* (2013.01)

(58) Field of Classification Search
CPC .......... H01J 1/14; H01J 49/16; H01J 49/0031; C01B 32/194; C01B 32/10; C01B 32/198; G01N 1/4022
See application file for complete search history.

(56) References Cited

U.S. PATENT DOCUMENTS

| | | |
|---|---|---|
| 4,047,101 A | 9/1977 | Bauerle et al. |
| 4,156,814 A | 5/1979 | Hunt et al. |
| 5,313,067 A | 5/1994 | Houk et al. |
| 5,756,996 A | 5/1998 | Bier et al. |
| 6,670,624 B1 | 12/2003 | Adams et al. |
| 6,885,010 B1 | 4/2005 | Traynor et al. |
| 7,323,682 B2 | 1/2008 | McCauley et al. |
| 8,603,363 B1 * | 12/2013 | Sinha .................... C23C 14/564 252/372 |
| 8,784,737 B2 | 7/2014 | Rafferty et al. |

(Continued)

FOREIGN PATENT DOCUMENTS

| | | |
|---|---|---|
| CN | 203367223 | 12/2013 |
| WO | WO2015100221 | 7/2015 |

OTHER PUBLICATIONS

Hummers et al., "Preparation of Graphitic Oxide," J. Am, Chem. Soc., vol. 80, Issue 6, 1958, p. 1339.

(Continued)

*Primary Examiner* — Anne M Hines
(74) *Attorney, Agent, or Firm* — Dority & Manning, P.A.

(57) ABSTRACT

A method for modifying a carbon thermal ionization filament is disclosed. In particular, the method requires a step of reacting a fluorine-containing compound with the carbon thermal ionization filament to provide a fluorinated carbon thermal ionization filament. Such method can result in a fluorinated carbon thermal ionization filament that can be employed in a system, such as a thermal ionization mass spectrometer, for ionizing a sample.

21 Claims, 4 Drawing Sheets

(56) References Cited

U.S. PATENT DOCUMENTS

| | | | |
|---|---|---|---|
| 9,000,364 | B2 | 4/2015 | Ermakov et al. |
| 9,159,542 | B2 | 10/2015 | Mullen et al. |
| 9,165,721 | B2 | 10/2015 | Lee et al. |
| 9,284,193 | B2 | 3/2016 | Cruz-Silva et al. |
| 9,327,983 | B2 | 5/2016 | Kwon et al. |
| 9,734,980 | B2 | 8/2017 | Li |
| 10,056,218 | B1 | 8/2018 | Hewitt et al. |
| 2006/0175952 | A1* | 8/2006 | Lee ............... H01J 9/025 313/311 |
| 2007/0231696 | A1 | 10/2007 | Yazami et al. |
| 2009/0166523 | A1 | 7/2009 | Bachmann et al. |
| 2010/0301212 | A1 | 12/2010 | Dato et al. |
| 2011/0127471 | A1 | 6/2011 | Shin et al. |
| 2012/0326022 | A1 | 12/2012 | Kumano et al. |
| 2013/0214147 | A1 | 8/2013 | Mullen et al. |
| 2013/0237723 | A1 | 9/2013 | Zhou et al. |
| 2013/0252499 | A1 | 9/2013 | Zhou et al. |
| 2013/0261352 | A1 | 10/2013 | Zhoe et al. |
| 2014/0087501 | A1 | 3/2014 | Chen et al. |
| 2015/0064463 | A1 | 3/2015 | Wu et al. |
| 2015/0276677 | A1 | 10/2015 | Li et al. |
| 2015/0280011 | A1 | 10/2015 | Cho et al. |
| 2015/0361089 | A1 | 12/2015 | Lee |
| 2015/0368804 | A1 | 12/2015 | Lee et al. |
| 2016/0325543 | A1 | 11/2016 | Casiraghi et al. |
| 2018/0251378 | A1 | 9/2018 | Chen |

OTHER PUBLICATIONS

Duan et al., "Characterization of an Improved Thermal Ionization Cavity Source for Mass Spectrometry," J. Am. Soc. Mass Spectrom., 1999, 10, 8 pages.

Calsteren, Peter, "Thermal ionization mass spectrometry," Encyclopedia of Earth Science, pp. 623-624.

Marcano et al., "Improved Synthesis of Graphene Oxide," ASC Nano, vol. 4, Jul. 22, 2010, pp. 4806-4814.

Kumar et al. "The impact of functionalization on the stability, work function, and photoluminescence of reduced graphene oxide," ACS Nano, Feb. 26, 2013, pp. 1638-1645.

Romero-Aburto et al., "Fluorinated Graphene Oxide; a New Multimodal Material for Biological Applications," National Institute of Health, Oct. 18, 2013, 25(39): 5632-5637.

Kong et al., "Applications of Graphene in Mass Spectrometry," Journal of Nanoscience and Nanotechnology, vol. 14, No. 7, Jul. 2014.

Peleg, Roni, "World's First commercial Conductive Graphene Filament for 3D Printing," 3Dprinting.com, Mar. 18, 2015, 4 pages.

Chandran, K.S. Ravi, "Transient Joule heating of graphene, nanowires and filaments: Analytical model for current-induced temperature evolution including substrate and end effects," International Journal of Heat and Mass Transfer, vol. 88, Sep. 2015, 3 pages.

Sygellou et al., "Work Function Tuning of Reduced Graphene Oxide Thin Films," J. Phys. Chem., Dec. 8, 2015, pp. 281-290.

Urbanová et al., "Fluorinated graphenes as advanced biosensors—effect of fluorine coverage on electron transfer properties and adsorption of biomolecules," Nanoscale, vol. 8, No. 24, Jun. 18, 2016, 12134-12142.

Wu et al., "Graphene nanosheet mediated MALDI-MS (GN-MALDI-MS) for rapid, in situ detection of intact incipient biofilm on material surfaces," Materials Science and Engineering, Sep. 1, 2016, 3 pages.

Urbanová et al., "A facile graphene oxide based sensor for electrochemical detection of neonicotinoids," Biosensors and Bioelectronics 89, 2017, 532-537.

Yao et al., "Three-Dimensional Printable High-Temperature and High-Rate Heaters," ACS Nano, vol. 10, 8 pages.

Markevich et al., "Doping of fluorographene by surface adsorbates," Physical Review B, 84:11, Sep. 22, 2011, 115439.

* cited by examiner

METHOD OF MAKING A CARBON FILAMENT FOR THERMAL IONIZATION

FEDERAL RESEARCH STATEMENT

This invention was made with government support under Grant No. DE-AC09-08SR22470 awarded by the U.S. Department of Energy. The government has certain rights in the invention.

BACKGROUND

Thermal ionization utilizes resistive heating of a filament to desorb and spontaneously ionize elemental species from a solid sample located in contact with the filament. In an analytical protocol, the desorbed ions are collected via acceleration and focusing to form an ion beam that is directed to a mass spectrometer. Thermal ionization mass spectrometry (TIMS) is the benchmark technique for determination of isotope ratios of elements in geochronology and tracer studies. For example, TIMS is commonly utilized in analysis of radiometric systems including U→Th→Pb, Rb→Sr, Sm→Nd, Lu→Hf and the uranium series disequilibrium. TIMS is also useful in analysis of non-terrestrial systems in determining the decay of short-lived radionuclides as found in meteorites such as Fe→Ni, Mn→Cr, Al→Mg, etc. Non-radiogenic, stable isotope ratios for various elements such as Li, B, Mg, Ca, and Fe are also often characterized by use of TIMS in order to, e.g., characterize exchange processes, track reservoir interaction and evaluate kinetic processes.

While TIMS offers many benefits to analytics including very precise measurements, consistent mass fractionation and highly automated operation, disadvantages exist. For instance, ionization efficiency of the sample may be lower than desired, such as approximately 0.1%. This may lead to low utilization of the sample thereby leaving much room for improvement. Ionization efficiency is related to the electronic work function of the filament material. Increasing the work function can increase the ionization efficiency of the filament material. With the goal of creating a filament material with a higher work function, carbon may be modified/doped by introducing a dopant directly into an original carbon paste and thereafter forming the thermal ionization filament. However, such modification/doping may yield a lower than desired work function of the TIMS material while also affecting storage stability. In addition, such method of modification/doping may also negatively affect the electrical conductivity of the filament.

As a result, it is desired to provide an improved method of modifying the surface of a carbon thermal ionization filament, thereby providing improved properties and characteristics.

SUMMARY

In accordance with one embodiment of the present invention, a method for modifying a carbon thermal ionization filament is disclosed. The method comprises a step of reacting a fluorine-containing compound with the carbon thermal ionization filament to provide a fluorinated carbon thermal ionization filament.

In accordance with another embodiment of the present invention, a fluorinated carbon thermal ionization filament is disclosed. The fluorinated carbon thermal ionization filament is prepared by reacting a fluorine-containing compound with a carbon thermal ionization filament.

In accordance with another embodiment of the present invention, a system for ionizing a sample is disclosed. The system comprises a fluorinated carbon thermal ionization filament, a power source in electrical communication with the fluorinated carbon thermal ionization filament wherein the power source is configured to resistively heat the fluorinated carbon thermal ionization filament, and an ion collector in communication with the fluorinated carbon thermal ionization filament such that ions emitted from a sample located on the fluorinated carbon thermal ionization filament pass through the ion collector wherein the ion collector is configured to form an ion beam comprising the ions. The fluorinated carbon thermal ionization filament is prepared by reacting a fluorine-containing compound with a carbon thermal ionization filament.

In accordance with another embodiment of the present invention, a method for forming an ion beam is disclosed. The method comprises: contacting a fluorinated carbon thermal ionization filament with a solid sample, heating the fluorinated carbon thermal ionization filament to a temperature at which atoms of the solid sample are desorbed and ionized, and collecting and focusing the desorbed ions to form the ion beam. The fluorinated carbon thermal ionization filament is prepared by reacting a fluorine-containing compound with a carbon thermal ionization filament.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
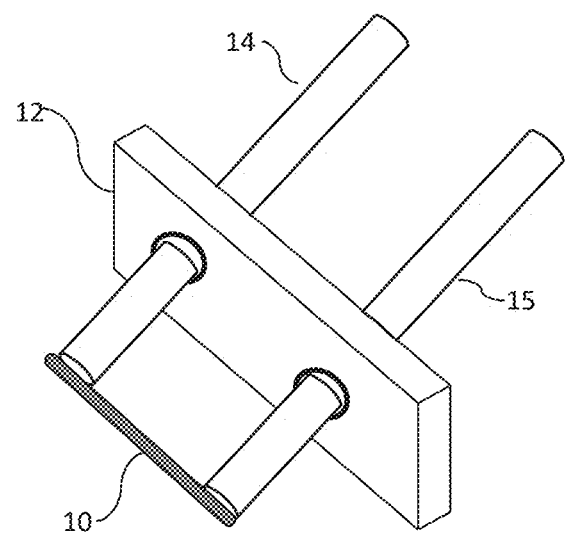
FIG. 1 schematically illustrates one embodiment of a carbon thermal ionization filament configuration in a system as described.
Figure 2:
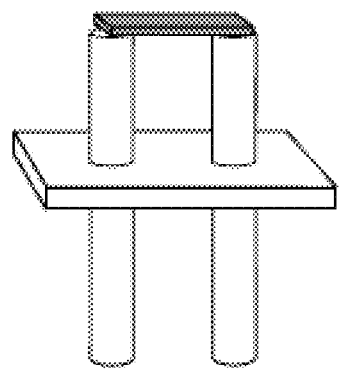
FIG. 2-FIG. 8 illustrate possible shapes for a carbon thermal ionization filament.
Figure 3:
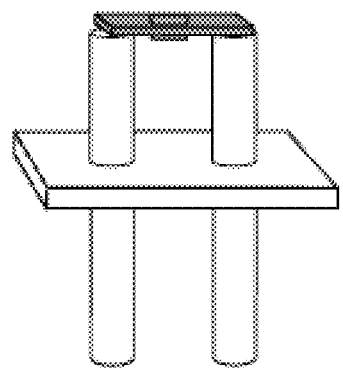
Figure 4:
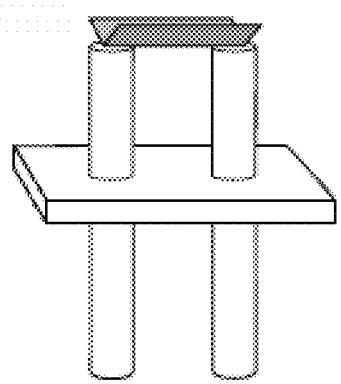
Figure 5:
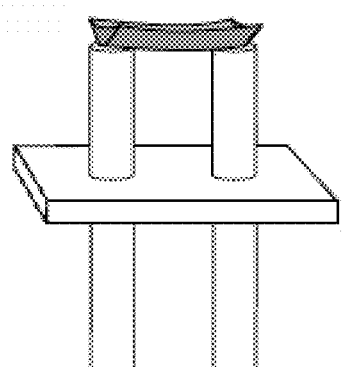
Figure 6:
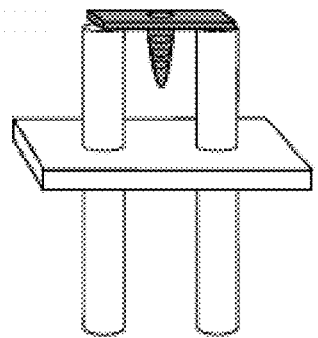
Figure 7:
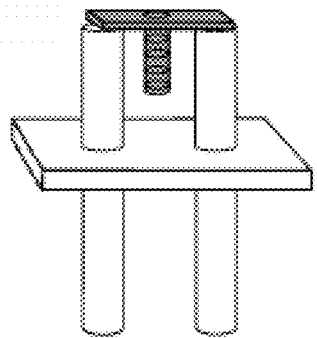

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Generally, the present disclosure is directed to a method for preparing a carbon thermal ionization filament and is also directed to a resulting carbon thermal ionization filament. In particular, the method allows for functionalizing the carbon thermal ionization filament via a step of contacting the carbon thermal ionization filament with a fluorine-containing compound. Such contacting, based on the conditions, can result in a reaction with the carbon thermal ionization filament wherein the reaction may provide a carbon thermal ionization filament having a fluorinated surface.

The present inventors have discovered that modifying a carbon thermal ionization filament in such a manner can provide many advantages over employing a fluorine-containing compound in a carbon paste prior to forming the carbon thermal ionization filament. In particular, the present inventors have discovered that such method can provide a carbon thermal ionization filament having an increased work function, thereby improving the ionization efficiency, which can in turn provide a route for development of reaction pathways and examination of elements not previously possible when utilizing traditional metal filaments. Moreover, the increased efficiency can allow for successful ionization of smaller sample sizes than possible with previously known systems. In addition to the aforementioned, such functionalization can positively impact the storage stability of the filament. Also, in comparison to prior methods, the electrical conductivity of the carbon thermal ionization filament may not be impacted substantially in an undesired manner.

In general, the carbon thermal ionization filament may include a single layer material (e.g., graphene, graphene oxide, reduced graphene oxide) or a multilayer material (e.g., graphite, graphite oxide, reduced graphite oxide). In one particular embodiment, the carbon thermal ionization filament may include a single layer material including a single carbon layer. In another particular embodiment, the carbon thermal ionization filament may include a multilayer material including multiple carbon layers.

In general, as indicated above, the carbon thermal ionization filament includes graphene, graphene oxide, reduced graphene oxide, graphite, graphite oxide, reduced graphite oxide, or combinations thereof. In one embodiment, the carbon thermal ionization filament includes graphene, graphene oxide, reduced graphene oxide, or combinations thereof. In another embodiment, the carbon thermal ionization filament includes graphite, graphite oxide, reduced graphite oxide, or combinations thereof. In one particular embodiment, the carbon thermal ionization filament includes graphene oxide, such as reduced graphene oxide.

As utilized herein, the term "graphene" generally refers to the crystalline allotrope of carbon in which individual carbon atoms of the structure are bound to three adjacent carbon atoms in an $sp^2$ hybridized manner so as to define a one atom thick planar carbon sheet in which the carbon atoms are arranged in the sheet, such as a planar sheet, in a honeycomb-like network of tessellated hexagons. In this regard, the carbon thermal ionization filament may include a single layer of graphene on a suitable support structure, multiple layers of graphene (i.e., graphite) on a suitable support structure, a macroscopic structure composted of many individual graphene flakes deposited/formed on a suitable support, or a macroscopic sized object created entirely from annealed graphene or annealed graphene oxide. Annealing of graphene and reduced graphene oxide sheets can occur via a thermal mechanism, chemical mechanism, or some combination of the two. In addition, the carbon thermal ionization filament may be one that includes only carbon in the crystalline lattice structure or a derivative thereof that could include additional elements such as and not limited to nitrogen, oxygen, sulfur, osmium, etc. in the lattice structure. The carbon thermal ionization filament may also include derivative groups bonded to the ring structure including functional groups and coordination compounds thereof. As such, the carbon thermal ionization filament may refer to a high aspect ratio structure (e.g., with L/D greater than about 10) that includes any of the aforementioned materials.

In general, the carbon thermal ionization filament may also include other materials. For example, the filament may be in the form of a composite wherein the filament is supported on a substrate, such as a metal substrate. The metal may be a material acceptable for use in thermal ionization and may, in particular, be a refractory metal. For instance, the metal may be rhenium, tungsten, tantalum, niobium, molybdenum, or any mixture thereof. The metal may also include titanium, vanadium, chromium, manganese, zirconium, technetium, ruthenium, rhodium, hafnium, osmium, iridium, or any mixture thereof.

In general, the carbon of the carbon thermal ionization filament may be prepared using any method known in the art. In particular, when the carbon is graphene, the graphene may be obtained using standard methodology and is not necessarily limited. For example, it may be formed by exfoliation of graphite or in the gas phase by passing liquid droplets of ethanol into argon plasma in an atmospheric-pressure microwave plasma reactor.

Graphene oxide is a family of impure oxidized forms of graphene that can include hydroxyl and/or epoxide groups bonded to various carbon atoms in the lattice. Graphene oxide may optionally include carboxylic acid groups, for instance at the edges of the carbon sheet(s). Such functional groups can provide a route for further chemical functionalization of the graphene oxide. Graphene oxide may exhibit a wide range of oxidation levels, for instance with oxygen-to-carbon ratios up to about 1:2. Graphene oxide may be prepared by the traditional treatment of graphite with potassium chlorate and fuming nitric acid, the Hummer's method using sulfuric acid, sodium nitrate, and potassium permanganate to convert graphite to graphene oxide, or a modified Hummer's method using sulfuric acid, phosphoric acid, and potassium permanganate.

Reduced graphene oxide may be measured having oxygen-to-carbon ratios as low as about 1:24 in some embodiments. Graphene oxide may be reduced by a number of different processes to produce reduced graphene oxide. For instance, colloidally-dispersed graphene oxide in water may be chemically reduced using hydrazine monohydrate. Other chemical reductants for graphene oxide include hydroquinone, gaseous hydrogen, and strongly basic solutions. Thermal exfoliation and reduction of graphene oxide occurs upon heating to 1050° C. with extrusion to remove the generated byproduct of carbon dioxide gas. Electrochemical reduction of graphene oxide may be accomplished by placing electrodes at opposite ends of a graphene oxide structure (e.g., a filament formed primarily of graphene oxide) on a non-conductive substrate, followed by the application of an electrical current to the structure.

Regardless of the type of carbon, it should be understood that the carbon thermal ionization filament can be made using techniques generally known in the art. The carbon thermal ionization filament can be formed and/or deposited directly onto any surface that is chemically inert to the graphene/solute mixture. Following, the green structure can be annealed in order to maintain its shape. As such, the substrate upon which the carbon material is deposited can be one that can be stable at the high annealing temperatures. In addition, if the graphene is to be retained on the substrate as a composite carbon thermal ionization filament, the substrate should be one that can be stable at the high thermal ionization temperatures.

One method for forming a carbon thermal ionization filament is via an additive manufacturing process, such as 3-D printing, which can provide a facile route to production of filament geometries that can further improve ionization efficiency as well as to improve focusing and capture of the desorbed ions. Typically, with additive manufacturing, the material for formation of the filament is deposited according to a controlled deposition and solidification process and may utilize extrusion of the material in the form of a concentrated solution or suspension (generally referred to herein as an ink) to produce a layer, followed by spontaneous or controlled curing of the extrudate in the desired pattern. In some methods, successive layers are individually solidified prior to deposition of the succeeding layer, with each successive layer becoming adhered to the previous layer during the solidification process. Alternatively, successive layers of the extrudate can be built up and the entire structure can be cured in a single process. In one embodiment, a 3-D printing process can be used in which the formation material is extruded to form the successive layers of the filament. By way of example, an aqueous ink can be extruded in the form of a suitably high viscosity liquid to form a single layer in the desired shape of the filament. Following, another layer or area of the ink can be applied, and so on to build the entire three-dimensional filament.

Of course, a carbon thermal ionization filament formation process is not limited to an additive manufacturing process and any suitable formation method may alternatively be utilized. By way of example, in some embodiments, a carbon thermal ionization filament may be formed according to a fiber spinning and/or casting process such as has been described, for instance in U.S. Pat. No. 9,284,193 and U.S. Patent Application Publication No. 2015/0064463, both of which being incorporated herein by reference.

Briefly, according to one exemplary embodiment, a graphene oxide dispersion or slurry that includes a high concentration of graphene oxide (e.g., high enough that the flakes can spontaneously form a three-dimensional network) can be spread to a very thin layer on a casting plate (e.g., a polytetrafluoroethylene casting plate). Drying can be allowed to proceed naturally or can be accelerated by using forced convection of warm air in a controlled environment (e.g., less than 30% relative humidity). After drying, the film can be lifted off from the casting plate and the filaments can then be prepared by cutting the thus-formed film into the desired geometries.

According to another embodiment, a filament can be formed according to a spinning process such as a spunlace process or an electric spinning process, in which a graphene oxide solution can be injected into a second solution that contains at least one cationic surfactant, at least one cation and optionally an acidic reductant. As the first solution including the graphene oxide flakes is injected into the second solution under a driving force, each flake can become arranged generally in parallel to the direction of the driving force. In addition, the positive charges of the cationic surfactant and the cations of the second solution can preferably interact with the negative charges on the surface of the graphene oxide flakes and invoke a crosslink reaction bonding the flakes to one another. The chemical bonds between the flakes cause flocculation and generation of the fiber. The graphene oxide fiber can optionally be reduced by use of the acidic reductant to form a reduced graphene oxide fiber. Individual filaments can then be cut to a desired length from the fiber.

In yet another embodiment, a graphene coating on an underlying substrate can be in the form of a single, continuous layer of a single or few-sheet layer of graphene formed on the underlying substrate, e.g., an underlying metal filament formed of a typical TIMS material such as tungsten, rhenium, etc. Thus, as indicated above, the carbon thermal ionization filament can be produced using a variety of materials and methods and is thus not necessarily limited by the present invention.

Referring to the figures, FIG. 1 schematically illustrates one embodiment of a carbon thermal ionization filament 10 held in a frame as may be incorporated into a system for formation of an ion beam and optionally, for analysis of ions in the ion beam (e.g., a TIMS system). The carbon thermal ionization filament 10 can have a traditional, ribbon type shape as is common for metal filaments in traditional thermal ionization systems, and as illustrated in FIG. 1, or can have a different geometry and orientation, for instance as may encourage directional desorption of the ions and improved collection and focusing in formation of the ion beam. For example, a filament can be formed with a geometry that can maximize the surface area to volume ratio of the filament so as to increase ionization efficiency of the thermal ionization process.

In this regard, the size or shape of the carbon thermal ionization filament is not necessarily limited. In particular, by utilizing a carbon source for the carbon thermal ionization filament, the filament can be formed and shaped according to a variety of processing techniques, including additive manufacturing processes such as 3-D printing, which can provide a facile route to production of filament geometries that can further improve ionization efficiency as well as to improve focusing and capture of the desorbed ions.

Figure 8:
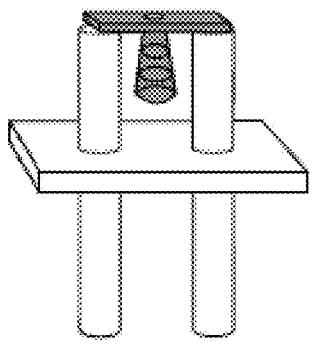
Figure 9:
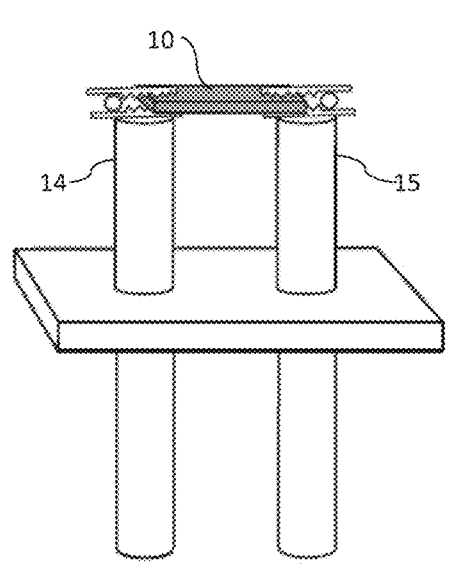
FIG. 9-FIG. 12 illustrate possible electrical connections for a carbon thermal ionization filament.
Figure 10:
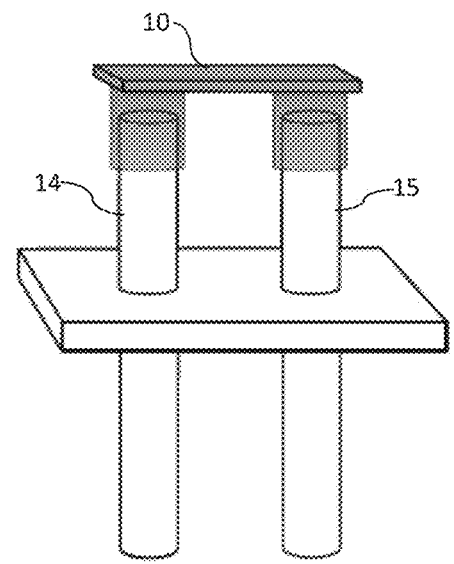
Figure 11:
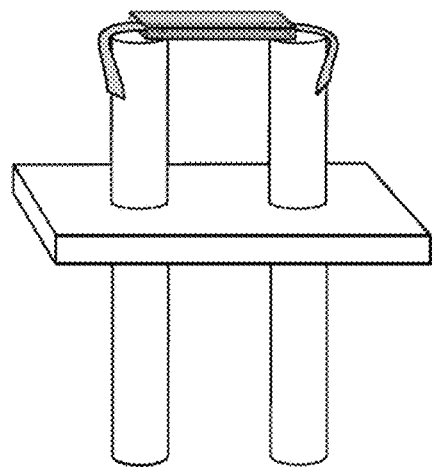

Accordingly, examples of filament orientations and geometries include, without limitation, those illustrated in FIG. 2-FIG. 8 that include a "flat" filament (FIG. 2), a "dimple" filament (FIG. 3), a "vee" filament (FIG. 4), a "canoe" filament (FIG. 5), a "deep cone" filament (FIG. 6), a "deep cylinder" filament (FIG. 7), and an "asymmetric cone" filament (FIG. 8). Other examples of geometries as may be utilized in forming a filament have been described, for instance, in "Characterization of an Improved Thermal Ionization Cavity Source for Mass Spectrometry" J. Am. Soc. Mass Spectrom., 1999, 10, 1008-1015.

Referring again to FIG. 1, following formation, the carbon thermal ionization filament 10 can be incorporated in a system, e.g., a TIMS system for use in analyzing isotopes of a sample. As shown, the carbon thermal ionization filament 10 can be retained, e.g. by use of a brace 12, in electrical communication with conductive elements 14, 15. For instance, the carbon thermal ionization filament 10 can be spot welded to each of the conductive elements 14, 15. During use, the sample can be located on the filament, generally in the form of a solid. For instance, a melt or solution including the sample can be applied to the filament, and following cooling and/or removal of any solvent, the solid sample can remain on the filament.

Figure 12:
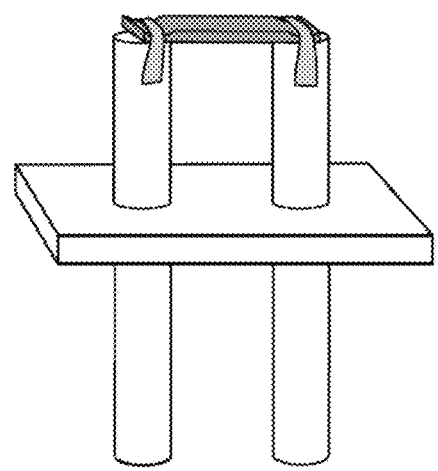

Any suitable connection can be utilized to provide contact between the carbon thermal ionization filament 10 and the conductive elements 14, 15. By way of example and without limitations, FIG. 9-FIG. 12 present typical connections including an alligator clip connection (FIG. 9), a friction fit connection (FIG. 10), an embedded strip connection (FIG. 11) and a dog bone connection (FIG. 12).

As indicated herein, the present invention is directed to a method for preparing a carbon thermal ionization filament. In particular, the method allows for functionalizing the carbon thermal ionization filament via a step of contacting the carbon thermal ionization filament with a fluorine-containing compound. In particular, such contacting, depending on the conditions, may result in a reaction that allows for the preparation of a fluorinated surface.

While the carbon thermal ionization filament is described above, the fluorine-containing compound may be an inorganic compound, an organic compound, or a combination thereof. In one embodiment, the fluorine-containing compound may be an inorganic compound. In another embodiment, the fluorine-containing compound may be an organic compound.

When the fluorine-containing compound is an inorganic compound, it may be any that can be utilized for functionalizing a carbon thermal ionization filament. The inorganic compound may be a solid, a liquid, or a gas. In one embodiment, the inorganic compound may be a solid. In another embodiment, the inorganic compound may be a liquid. In a further embodiment, the inorganic compound may be a gas. In this regard, the inorganic compound may include, but is not limited to, $F_2$, $XeF_2$, HF, hexafluorophosphric acid, a fluoride (e.g., ammonium fluoride), a fluoroborate (e.g., sodium fluoroborate, potassium fluoroborate), a fluoroaluminate (e.g., potassium fluoroaluminate), a fluorosilicate (e.g., sodium fluorosilicate), or a combination thereof. In one embodiment, the inorganic compound includes a fluoride, such as ammonium fluoride. In another embodiment, the inorganic compound includes a gas, such as $F_2$.

When the fluorine-containing compound is an organic compound, it may be any that can be utilized for functionalizing a carbon thermal ionization filament. For instance, the organic compound may be a polymer, in particular a melt processable polymer. For instance, the polymer may have a melting temperature of 50° C. or more, such as 100° C. or more, such as 150° C. or more, such as 200° C. or more, such as 250° C. or more, such as 300° C. or more, such as 350° C. or more to 600° C. or less, such as 500° C. or less, such as 450° C. or less, such as 400° C. or less, such as 350° C. or less.

In one embodiment, the organic compound may be a fluoropolymer. For instance, the fluoropolymer may include, but is not limited to, polytetrafluoroethylene, perfluoroalkoxy polymer, fluorinated ethylene propylene polymer, ethylene tetrafluoroethylene copolymer, polyvinylidene fluoride, polyvinylfluoride, ethylene chlorotrifluoroethylene copolymer, polychlorotrifluoroethylene, perfluoropolyether, perfluorinated elastomer, tetrafluoroethylene propylene, polyhexafluoropropylene, or a mixture thereof. In one particular embodiment, the fluoropolymer includes polytetrafluoroethylene.

The fluoropolymer may have a particular molecular weight. For instance, the weight average molecular weight may be 5,000 g/mol or more, such as 10,000 g/mol or more, such as 20,000 g/mol or more, such as 25,000 g/mol or more, such as 40,000 g/mol or more, such as 50,000 g/mol or more, such as 100,000 g/mol or more. The weight average molecular weight may be 1,000,000 g/mol or less, such as 500,000 g/mol or less, such as 400,000 g/mol or less, such as 300,000 g/mol or less, such as 250,000 g/mol or less, such as 200,000 g/mol or less, such as 150,000 g/mol or less, such as 100,000 g/mol or less, such as 75,000 g/mol or less, such as 50,000 g/mol or less. The aforementioned molecular weights may also apply to a number average molecular weight of the fluoropolymer.

As indicated herein, the fluorine-containing compound is contacted with the carbon thermal ionization filament. Such contact may include various methods such as immersing the filament into a solution, spraying the filament with a solution, exposing the filament to a gas, placing the compound onto the filament, and other known techniques in the art that may allow for the carbon thermal ionization filament to become functionalized. In one particular embodiment, the fluorine-containing compound, such as the aforementioned fluoropolymer, is simply placed onto the carbon thermal ionization filament.

Thereafter, conditions may allow for a reaction that may allow for the formation of a carbon-fluorine covalent bond. In one embodiment, however, some of the carbon may be unreacted thereby resulting in partial fluorination. Regardless, the formation of the covalent bond may change the hybrid state of the carbon from $sp^2$ to $sp^3$ and such change may affect various properties of the carbon and resulting carbon thermal ionization filament.

In one embodiment, the reaction and resulting fluorination may occur via thermal heating. For instance, the temperature may be as necessary to allow for such fluorination to occur. In this regard, depending on the type of compound, the temperature may be 100° C. or less or 100° C. or more. For instance, the temperature may be from 30° C. or more, such as 40° C. or more, such as 50° C. or more, such as to 100° C. or less, such as 90° C. or less, such as 80° C. or less. Alternatively, the temperature may be 100° C. or more, such as 150° C. or more, such as 200° C. or more, such as 250° C. or more, such as 300° C. or more, such as 500° C. or more, such as 750° C. or more, such as 900° C. or more, such as 1000° C. or more, such as 1250° C. or more, such as 1500° C. or more, such as 1600° C. or more, such as 1700° C. or more to 2500° C. or less, such as 2250° C. or less, such as 2000° C. or less, such as 1900° C. or less, such as 1800° C. or less, such as 1700° C. or less, such as 1500° C. or less, such as 1000° C. or less, such as 750° C. or less, such as 600° C. or less, such as 500° C. or less, such as 450° C. or less, such as 400° C. or less, such as 350° C. or less.

Such reaction may be allowed to undergo for any desired amount of time in order to obtain a carbon thermal ionization filament having the desired fluorination. Accordingly, the time may not necessarily be limited. For instance, the time may be 0.1 hours or more, such as 0.2 hours or more, such as 0.25 hours or more, such as 0.5 hours or more, such as 1 hour or more, such as 2 hours or more to 10 hours or less, such as 7.5 hours or less, such as 5 hours or less, such as 4 hours or less, such as 3 hours or less, such as 2.5 hours or less, such as 2 hours or less, such as 1.5 hours or less.

Such reaction may also be conducted at any pressure that allows for fluorination of the carbon thermal ionization filament. For instance, the pressure may be about atmospheric pressure or may even be less than or greater than atmospheric pressure. In addition, the reaction may be allowed to occur in the present of air or an inert gas (e.g., nitrogen, argon, etc.) such that the environment is free of oxygen.

Regardless of the compound utilized, the carbon thermal ionization filament may include the fluorine and carbon within certain percentages. For instance, fluorine may be present in an amount of from 0.01 wt. % or more, such as 0.1 wt. % or more, such as 0.25 wt. % or more, such as 0.5 wt. % or more, such as 1 wt. % or more, such as 2 wt. % or more, such as 2.5 wt. % or more, such as 5 wt. % or more to 50 wt. % or less, such as 40 wt. % or less, such as 30 wt. % or less, such as 20 wt. % or less, such as 15 wt. % or less, such as 10 wt. % or less, such as 5 wt. % or less. Meanwhile, the carbon may be present in an amount of from 40 wt. % or more, such as 50 wt. % or more, such as 60 wt. % or more, such as 70 wt. % or more, such as 75 wt. % or more, such as 80 wt. % or more, such as 85 wt. % or more, such as 90 wt. % or more, such as 95 wt. % or more to less than 100 wt. %, such as 99 wt. % or less, such as 97 wt. % or less, such as 95 wt. % or less, such as 90 wt. % or less, such as 85 wt. % or less. Such aforementioned weight percentages may also apply to percentages based on atomic units.

In addition to fluorine and carbon, the carbon thermal ionization filament may contain other elements. Such other elements may be present in an amount of from 0.01 wt. % or more, such as 0.1 wt. % or more, such as 0.25 wt. % or more, such as 0.5 wt. % or more, such as 1 wt. % or more, such as 2 wt. % or more, such as 2.5 wt. % or more, such as 5 wt. % or more to 50 wt. % or less, such as 40 wt. % or less, such as 30 wt. % or less, such as 20 wt. % or less, such as 15 wt. % or less, such as 10 wt. % or less, such as 5 wt. % or less. These elements may include O, S, N, etc. and the aforementioned percentages may apply to these elements alone or in any combination. In addition, such aforementioned weight percentages may also apply to percentages based on atomic units.

Above, it is mentioned that the fluorine-containing compound is contacted with a carbon thermal ionization element. In one embodiment, the carbon thermal ionization filament may include graphene oxide. Prior to the aforementioned contacting step, in one embodiment, the graphene oxide may be prepared from graphite. In addition, the graphene oxide may be prepared such that it is in the desired shape of a filament and is then functionalized.

In one particular embodiment, the carbon thermal ionization filament includes a graphene oxide, such as reduced graphene oxide. In this regard, prior to contacting the carbon thermal ionization filament with the fluorine containing compound, in one embodiment, a step of forming graphene oxide may be performed. In particular, in one embodiment, the step may require forming graphene oxide from graphite, in particular using methods known in the art. In another embodiment, the step may require forming graphene oxide from graphene, in particular using methods known in the art.

Once graphene oxide is formed, for example as a paste, the graphene oxide may be shaped to form the carbon thermal ionization filament. As mentioned herein, such shape is not necessarily limited. However, in one embodiment, such shape may be relatively planar such that it is formed into a sheet. Accordingly, the graphene oxide may be formed into a sheet at a desired thickness. The thickness is not necessarily limited and should be selected in view of the desired resulting filament resistance.

Upon forming a sheet, the graphene oxide may be manipulated to form the filaments. For instance, the sheet may be cut into desired dimensions, such as the shape of a rectangle, for the filaments. In addition, prior to functionalizing the graphene oxide may be reduced by heating to a certain temperature, such as from 50° C. to 200° C., but may be any other temperature that allows for reduction.

As indicated herein, the carbon thermal ionization filament is modified using a fluorine-containing compound. Such modification may occur after the carbon thermal ionization filament is provided in a filament assembly (or frame) or before the carbon thermal ionization filament is provided in a filament assembly (or frame). In one embodiment, the carbon thermal ionization filament is first fluorinated and then provided in a filament assembly (or frame). In another embodiment, the carbon thermal ionization filament is provided in a filament assembly (or frame) and thereafter fluorinated.

Figure 14A:
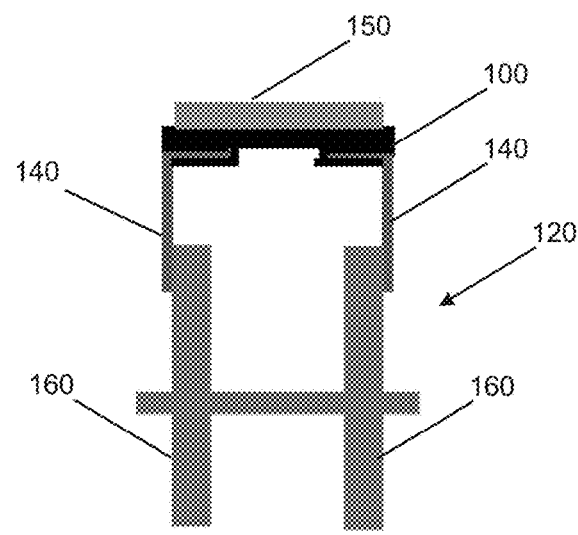
FIG. 14A-FIG. 14C illustrate a method of modifying a carbon thermal ionization filament.
Figure 14B:
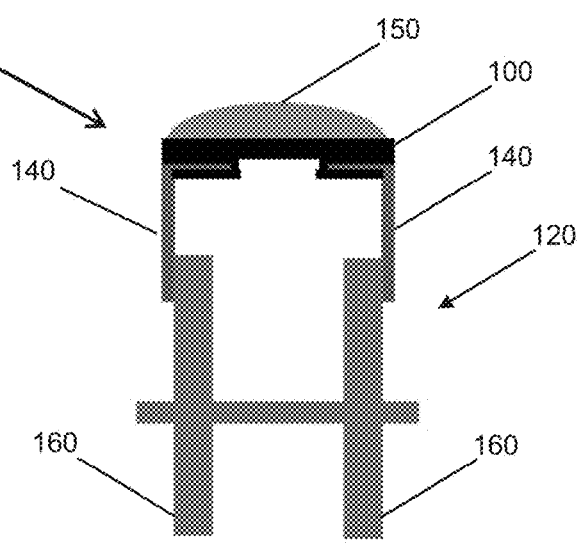
Figure 14C:
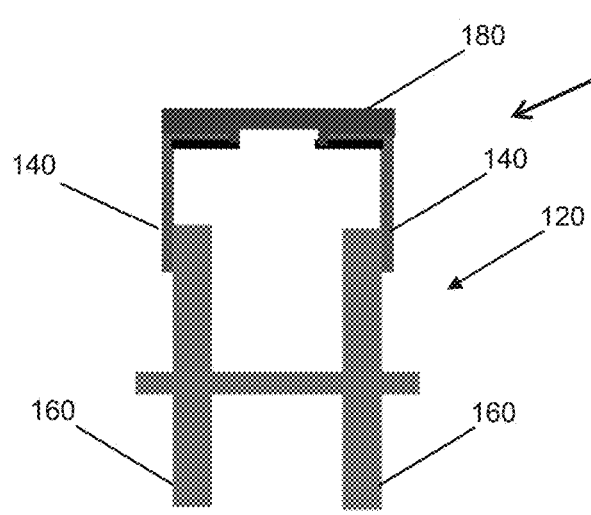

The filament assembly (or frame) for use in a thermal ionization mass spectrometer is not necessarily limited. One example of such has been illustrated in FIGS. 1-12. Another example is illustrated in FIGS. 14A-14C. According to FIG. 14A, the carbon thermal ionization filament 100 is connected to an assembly (or frame) 120. In particular, the carbon thermal ionization filament 100 is connected to the assembly using a metal strip 140. The metal strip 140 may be made from a transition metal or a refractory metal, such as rhenium. Such metal strips may be mechanically connected to the assembly 120. For instance, such mechanical connection may be via a weld, such as a spot weld. In addition, the metal strip 140 may be connected to the carbon thermal ionization filament 100 using any method known in the art. In particular, such connection may be a mechanical connection or a chemical connection. The assembly 120 may include conductive elements 160, such as conductive posts, which may extend from or through an intermediate frame or plate. These conductive elements may be made from any known metal in the art utilized for thermal ionization mass spectrometry. For instance, the post assembly may be made from stainless steel.

In addition, the metal strip 140 may be included such that a top surface and a bottom surface of the metal strip 140 are at least partially covered by the carbon thermal ionization filament. In this regard, an edge of the metal strip 140 may be encapsulated within the carbon thermal ionization filament 100. Such encapsulation may be achieved by placing a paste, such as a graphene oxide paste, onto the carbon thermal ionization filament 100 and thereafter pressing the metal strip 140 into the paste. Then, further paste, such as graphene oxide paste, may be placed onto the back of the metal strip 140. Alternatively, the first graphene oxide paste may be eliminated such that the metal strip 140 is placed against the carbon thermal ionization filament 100 and a paste, such as a graphene oxide paste, is placed onto the back of the metal strip 140. Thereafter, the paste may be allowed to dry at desired conditions (e.g., temperature, time, etc.).

As indicated herein, the carbon thermal ionization filament, such as one including graphene oxide, may be at least partially reduced prior to fluorination and contacting the carbon thermal ionization filament with the fluorine containing compound. Such partial reduction may be performed at a desired temperature and for a desired time in order to obtain the desired reduction. After reduction, the carbon thermal ionization filament may have a resistance of less than $5E^6\Omega$, such as $1E^6\Omega$ or less, such as $1E^5\Omega$ or less, such as $1E^4\Omega$ or less, such as $1E^3\Omega$ or less, such as $1E^2\Omega$ or less to $1E^{-2}\Omega$ or more, such as $1E^{-1}\Omega$ or more, such as $1\Omega$ or more, such as $1E^1\Omega$ or more, such as $1E^2\Omega$ or more.

In FIG. 14A, a fluorine containing compound 150 is provided on the carbon thermal ionization filament 100. Upon providing thermal heating, the desired functionalization may occur. For instance as illustrated in FIGS. 14B and 14C, when the fluorine containing compound 150 is a fluoropolymer, the heating allows for melting of the fluoropolymer and resulting functionalization. The heating may be conducted under vacuum or at atmosphere at a certain temperature. For instance, the temperature may be 100° C. or more, such as 150° C. or more, such as 200° C. or more, such as 250° C. or more, such as 300° C. or more, such as 350° C. or more to 750° C. or less, such as 650° C. or less, such as 600° C. or less, such as 550° C. or less, such as 500° C. or less, such as 450° C. or less, such as 400° C. or less.

Depending on the conditions, a certain voltage may be applied resulting in a certain current to allow for melting of the fluoropolymer. Thereafter, the carbon thermal ionization filament may be placed under vacuum or remain under vacuum and then heated at a relatively high temperature. For instance, the temperature may be 500° C. or more, such as 750° C. or more, such as 900° C. or more, such as 1000° C. or more, such as 1250° C. or more, such as 1500° C. or more, such as 1600° C. or more, such as 1700° C. or more to 2500° C. or less, such as 2250° C. or less, such as 2000° C. or less, such as 1900° C. or less, such as 1800° C. or less, such as 1700° C. or less, such as 1500° C. or less.

Upon fluorinating the surface, a fluorinated carbon thermal ionization filament 180 may be provided. While the heating may be thermal heating, in one embodiment, the heating may be the result of the current which in turn can heat the filament in order to provide the necessary thermal energy for the melting and/or reaction to occur. Accordingly, such form of heating may be after the carbon thermal ionization filament is provided in the assembly. Meanwhile, other forms of heating may be employed when the carbon thermal ionization filament is fluorinated prior to affixing in an assembly.

Figure 13:
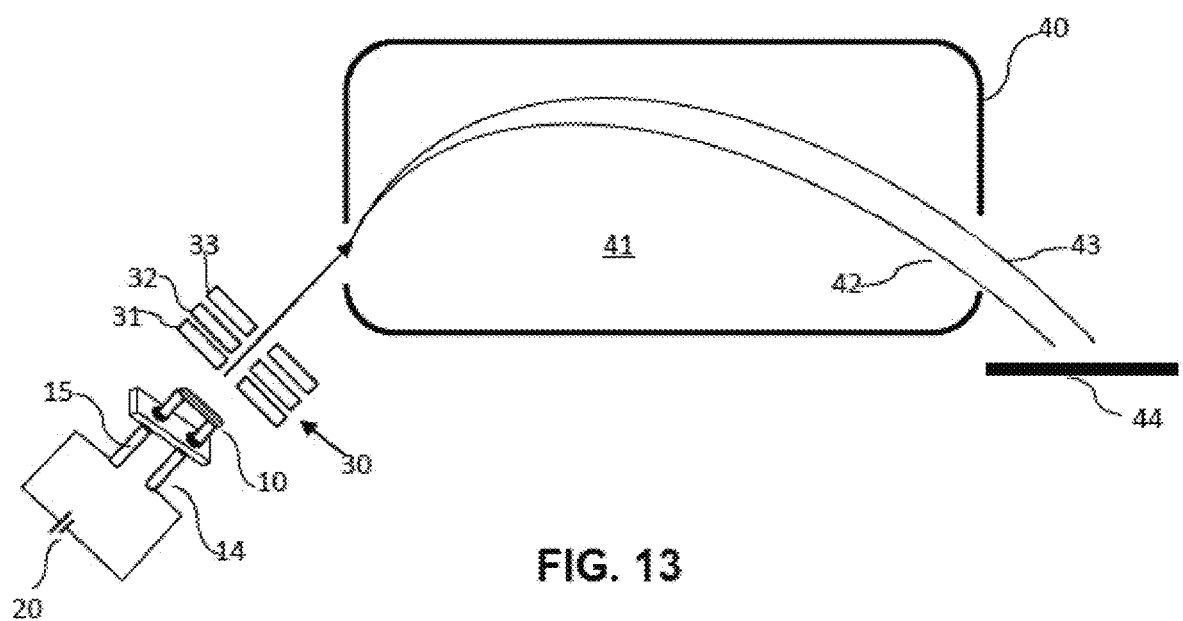
FIG. 13 schematically illustrates one embodiment of a thermal ionization mass spectrometry system including a fluorinated carbon thermal ionization filament as described.

Meanwhile, FIG. 13 schematically illustrates a TIMS system that can incorporate the carbon thermal ionization filament. As shown, the filament 10 and conductive elements 14, 15 are in electrical communication with a power supply 20. The power supply 20 is not particularly limited. For instance, the power supply can be a direct current source. In other embodiments, the power supply 20 can be a radio frequency power source, a microwave frequency power source, or any other suitable power source as is generally known in the art. The electrical connections between the power supply 20 and electrically conductive elements 14, 15 can be utilized to resistively heat the carbon thermal ionization filament 10 to the operating temperature of the system, generally about 1000° C. or greater. For instance, the carbon thermal ionization filament 10 can be heated at a current ramp up rate of from about 100 mA/min to about 250 mA/min to a filament current of about 2 A or higher, for instance from about 2 A to about 3 A at which point the sample material located on the filament can spontaneously desorb and ionize via an electron affinity mechanism according to standard thermal ionization methodology.

The system can also include an ion collector 30 and a mass spectrometer 40 according to standard TIMS systems and practice. For instance, the ion collector 30 can include a series of slits and electrostatically charged plates at an electrical potential gradient (e.g., up to about 10 kV) capable of accelerating and focusing the desorbed ions into an ion beam. For example, the ion collector 30 can include a series of lens elements 31, 32, 33 maintained in a vacuum chamber and in electrical communication with a power supply (that can be the same or different as the power supply 20 in communication with the carbon thermal ionization filament) that can generally be maintained parallel to one other and axially fixed and spaced so as to establish a series of electric fields to form and accelerate an ion beam toward the magnetic field 41 of the mass spectrometer 40.

The mass spectrometer can be any suitable mass spectrometer as is known in the art such as, for example, a DC quadrupole mass spectrometer, a time of flight mass spectrometer, an ion trap, an orbit trap, etc.

A voltage source (which can be the same or different as the power source 20), can apply RF and DC potentials to the rods of the mass spectrometer, as is known. As the ion beam passes through the magnetic field 41 the original ion beam is dispersed into separate beams on the basis of their mass to charge ratio. These mass-resolved beams 42, 43 are then directed into collectors 44 where each ion beam 42, 43 is converted into a voltage. Comparison of voltages corresponding to individual ion beams 42, 43 can yield precise isotope ratios.

A system can include additional controllers and feedback loops as are generally known in the art. For instance, a controller can be included in communication with the collectors 44 that can adjust the duty cycle of the mass spectrometer based upon the mass and/or ion current being transmitted through the system. In one embodiment, the current of the carbon thermal ionization filament 10 can be monitored, and this information can be fed to the power source 20 to control the filament temperature and provide for current regulation. Other ion optical, ion filtering, and/or ion transmission control elements may optionally be included between the ion source filament 10 and the ion collectors 44 as is known in the art.

Moreover, it should be understood that the disclosed methods and systems are not limited to ion collection and analysis, and in some embodiments, the ions formed and optionally separated by use of the disclosed systems can be utilized, for instance to bombard a target, as is known in the art.

The systems including the carbon thermal ionization filaments can be used to ionize a wide variety of elemental samples including, without limitation, Pu, U, Th, Pb, Rb, Sr, Sm, Nd, Lu, Hf, Re, Os, Hf, Fe, Ni, Mn, Cr, Al, Mg, Zr, Mo, Ru, Li, B, and Ca. The systems are not limited to such known thermal ionization materials, however, as the improved ionization efficiencies afforded by the disclosed systems and methods can open up the thermal ionization processes to thermal ionization of elements not previously suitable for such methodologies as well as the ability to interrogate much smaller sample sizes than previously thought possible.

While certain embodiments of the disclosed subject matter have been described using specific terms, such description is for illustrative purposes only, and it is to be understood that changes and variations may be made without departing from the spirit or scope of the subject matter.

The invention claimed is:

1. A method for modifying a carbon thermal ionization filament, the method comprising:
   reacting a fluorine-containing compound with the carbon thermal ionization filament to provide a fluorinated carbon thermal ionization filament.

2. The method of claim 1, wherein the carbon thermal ionization filament comprises graphene, graphene oxide, reduced graphene oxide, graphite, graphite oxide, reduced graphite oxide, or combinations thereof.

3. The method of claim 1, wherein the carbon thermal ionization filament comprises graphene oxide, reduced graphene oxide, or combinations thereof.

4. The method of claim 1, wherein the carbon thermal ionization filament comprises reduced graphene oxide.

5. The method of claim 1, wherein the fluorine-containing compound comprises an inorganic compound.

6. The method of claim 1, wherein the fluorine-containing compound comprises an organic compound.

7. The method of claim 1, wherein the fluorine-containing compound comprises a fluoropolymer.

8. The method of claim 7, wherein the fluoropolymer comprises polytetrafluoroethylene, perfluoroalkoxy polymer, fluorinated ethylene propylene polymer, ethylene tetrafluoroethylene copolymer, polyvinylidene fluoride, polyvinylfluoride, ethylene chlorotrifluoroethylene copolymer, polychlorotrifluoroethylene, perfluoropolyether, perfluorinated elastomer, tetrafluoroethylene propylene, polyhexafluoropropylene, or a mixture thereof.

9. The method of claim 7, wherein the fluoropolymer comprises polytetrafluoroethylene.

10. The method of claim 1, wherein the carbon thermal ionization filament is connected to a filament assembly.

11. The method of claim 10, wherein the reacting step is conducted prior to connecting the carbon thermal ionization filament to the filament assembly.

12. The method of claim 10, wherein the reacting step is conducted after connecting the carbon thermal ionization filament to the filament assembly.

13. The method of claim 10, wherein the carbon thermal ionization filament is connected to the filament assembly using a refractory metal.

14. The method of claim 1, wherein the reacting step occurs at a temperature of from 100° C. to 2500° C.

15. The method of claim 1, wherein the reacting step occurs by heating the fluorine-containing compound on the carbon thermal ionization filament and wherein the heating is provided by passing a current through a filament assembly and the carbon thermal ionization filament.

16. A fluorinated carbon thermal ionization filament made according to the method of claim 1.

17. A system for ionizing a sample comprising:
the fluorinated carbon thermal ionization filament of claim 16,
a power source in electrical communication with the fluorinated carbon thermal ionization filament, the power source being configured to resistively heat the fluorinated carbon thermal ionization filament; and
an ion collector in communication with the fluorinated carbon thermal ionization filament such that ions emitted from a sample located on the fluorinated carbon thermal ionization filament pass through the ion collector, the ion collector being configured to form an ion beam comprising the ions.

18. The system of claim 17, further comprising a mass spectrometer in communication with the ion collector such that the ions that pass through the ion collector enter a magnetic field of the mass spectrometer.

19. A method for forming an ion beam, the method comprising:
contacting the fluorinated carbon thermal ionization filament of claim 16 with a solid sample;
heating the fluorinated carbon thermal ionization filament to a temperature at which atoms of the solid sample are desorbed and ionized; and
collecting and focusing the desorbed ions to form the ion beam.

20. The method of claim 19, further comprising passing the ion beam through a magnetic field and thereby separating the ions of the ion beam according to their mass:charge ratio.

21. The method of claim 19, further comprising bombarding a target with the ion beam.

* * * * *